(12) United States Patent
Chen et al.

(10) Patent No.: US 7,722,242 B2
(45) Date of Patent: May 25, 2010

(54) LAMP FIXING STRUCTURE AND BACKLIGHT MODULE

(75) Inventors: Cheng-Hsiang Chen, Tainan County (TW); Chih-Hung Hsu, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 163 days.

(21) Appl. No.: 11/846,155

(22) Filed: Aug. 28, 2007

(65) Prior Publication Data

US 2008/0055916 A1 Mar. 6, 2008

(30) Foreign Application Priority Data

Aug. 31, 2006 (TW) .............................. 95132247 A

(51) Int. Cl.
  *F21V 7/04* (2006.01)
  *F21V 21/00* (2006.01)
  *F21V 15/00* (2006.01)
  *G09F 13/04* (2006.01)

(52) U.S. Cl. ................. 362/634; 362/97.1; 362/217.14; 362/377

(58) Field of Classification Search ................. 362/378, 362/377, 634, 97.1, 97.2, 97, 632, 633, 217.14, 362/217.15, 217.1, 217.11, 391, 614, 221, 362/217.17, 217.01; 349/64
See application file for complete search history.

(56) References Cited

U.S. PATENT DOCUMENTS

| 7,057,678 B2 * | 6/2006 | Ishida et al. ................... 349/58 |
| 7,137,824 B2 * | 11/2006 | Lin ............................... 439/58 |
| 7,452,102 B2 * | 11/2008 | Ryu ........................... 362/225 |
| 7,452,117 B2 * | 11/2008 | Chen et al. ................... 362/581 |
| 2004/0008512 A1 * | 1/2004 | Kim ........................... 362/235 |

* cited by examiner

*Primary Examiner*—Jong-Suk (James) Lee
*Assistant Examiner*—David R Crowe

(57) ABSTRACT

A lamp fixing structure is arranged with a lamp which has an electrode and a wire electrically connected to the electrode. The lamp fixing structure includes a lamp holder and at least one lamp protecting member. The lamp holder has at least one pressing part. The lamp protecting member has a first hole. The lamp is inserted into the lamp protecting member. The wire passes through the lamp protecting member from the first hole. The pressing part presses the lamp protecting member so that the first hole is fitted to the wire tightly.

6 Claims, 8 Drawing Sheets

LAMP FIXING STRUCTURE AND BACKLIGHT MODULE

CROSS REFERENCE TO RELATED APPLICATIONS

This Non-provisional application claims priority under 35 U.S.C. §119(a) on Patent Application No(s). 095132247 filed in Taiwan, Republic of China on Aug. 31, 2006 the entire contents of which are hereby incorporated by reference.

BACKGROUND OF THE INVENTION

1. Field of Invention

The invention relates to a fixing structure, a backlight module and a liquid crystal display (LCD) apparatus. More particularly, the invention relates to a lamp fixing structure capable of fixing/interconnecting a wire, a backlight module and an LCD apparatus including the lamp fixing structure.

2. Related Art

A liquid crystal display (LCD) apparatus has been widely used in various electronic products and gradually replaced the conventional cathode ray tube (CRT) display apparatus because the LCD apparatus advantageously has the low power consumption, low generated heat, light weight and non-radiative property.

In general, the LCD apparatus mainly includes an LCD panel and a backlight module. The LCD panel mainly has two substrates and one liquid crystal layer interposed between the two substrates. The backlight module is arranged to uniformly distribute light from a light source over the LCD panel.

FIG. 1 is a schematic illustration showing a conventional backlight module, which is a direct type backlight module 1. Referring to FIG. 1, the backlight module 1 includes a backplate 11, a plurality of lamps 12, two lamp holders 13, a plurality of lamp protecting members 14, a plurality of optical films 15 and a frame body 16.

The lamps 12 are cold cathode fluorescent lamps (CCFLs) and are separately arranged on the backplate 11. Two ends of the lamp 12 pass through the lamp protecting member 14. A wire 121 passes through the lamp protecting member 14 via a small hole of the lamp protecting member 14, and is electrically connected to the electrode of the lamp 12 by way of hook-soldering. The lamp holders 13 arranged to press the lamp protecting members 14 onto the backplate 11, and the lamp holders 13 are disposed on two lateral sides of the backplate 11. The optical films 15 are disposed on the lamp holders 13 and over the backplate 11 and then combined with the backplate 11 through the frame body 16 so that the lamps 12 and the optical films 15 are fixed between the frame body 16 and the backplate 11.

FIG. 2 is a partially schematic illustration showing a dashed-line portion of the backlight module 1 of FIG. 1. As shown in FIG. 2, the lamp protecting member 14 is disposed in a hollow chamber 131 of the lamp holder 13. An electrode 122 of the lamp 12 is electrically connected to the wire 121 by way of hook-soldering. The lamp 12 is inserted into the lamp protecting member 14. The wire 121 passes through a small hole 141 of the lamp protecting member 14. Because the lamp 12 is connected to the wire 121, both of the lamp 12 and the wire 121 are inserted into the lamp protecting member 14 through a slit (not shown) of the lamp protecting member 14.

Although the lamp 12 is connected to the wire 121 by way of soldering, the solder between the wire 121 and the lamp 12 may crack (i.e., undergo so called solder crack) due to the human carelessness or the application of improper external force when the operator is assembling or transporting the backlight module 1. Thus, the signal cannot be transferred to the lamp 12 through the wire 121 and accordingly the lamp 12 cannot illuminate. In addition, the structural design of the lamp protecting member 14 is disadvantageous to the soldering operator who is conducting the hook-soldering process directly in the lamp protecting member 14. That is to say, the operator has to first execute the hook-soldering process and then insert the lamp 12 and the wire 121, which are connected together, into the lamp protecting member 14 through the slit of the lamp protecting member 14. However, the diameter of the lamp 12 is larger than the width of the slit, so the connected parts tends to be damaged when the lamp 12 and the wire 121 are being inserted.

In addition, although not shown in the drawing, the wire 121 can be wound around the circumference of the lamp protecting member 14 in accordance with another know technique. In this particular arrangement the wire 121 is tightly attached to the lamp protecting member 14 by a relatively complicated manual winding process so that the solder crack does not easily occur under the twitching due to the application of an external force. However, this method greatly increases the production time, and increases production cost undesirably.

Therefore, it is an important subject to provide a lamp fixing structure and a backlight module of an LCD apparatus, in which the wire can be conveniently bonded and effectively fixed so that the solder crack caused by the twitching due to the application of an external force can be avoided and the yield and the reliability of the product an be enhanced.

SUMMARY OF THE INVENTION

In view of the foregoing, the invention is to provide a lamp fixing structure, which may be conveniently bonded and effectively fix a wire, and a backlight module of an LCD apparatus.

To achieve the above, the invention discloses a lamp fixing structure that is arranged with a lamp, which has an electrode and a wire electrically connected to the electrode. The lamp fixing structure includes a lamp holder and at least one lamp protecting member. The lamp holder has at least one pressing part. The lamp protecting member has a first hole, so that the lamp is inserted into the lamp protecting member. The wire passes through the lamp protecting member from the first hole. The pressing part presses the lamp protecting member so that the first hole and the wire are fitted tightly.

To achieve the above, the invention further discloses a backlight module, which includes a backplate, a lamp and a lamp fixing structure. The lamp has an electrode and a wire electrically connected to the electrode. The lamp fixing structure, which is disposed on the backplate, has a lamp holder and at least one lamp protecting member. The lamp holder has at least one pressing part. The lamp protecting member has a first hole, and the lamp is inserted into the lamp protecting member. The wire passes through the lamp protecting member from the first hole. The pressing part presses the lamp protecting member so that the first hole and the wire are fitted tightly.

To achieve the above, the invention also discloses a liquid crystal display (LCD) apparatus, which includes a backlight module and an LCD panel. The backlight module has a backplate, a lamp and a lamp fixing structure. The lamp has an electrode and a wire electrically connected to the electrode. The lamp fixing structure is disposed on the backplate. The lamp fixing structure has a lamp holder and at least one lamp protecting member. The lamp holder has at least one pressing part. The lamp protecting member has a first hole, and the lamp is inserted into the lamp protecting member. The wire passes through the lamp protecting member from the first hole. The pressing part presses the lamp protecting member so that the first hole and the wire are fitted tightly. The LCD panel is disposed adjacent to the backlight module.

As mentioned above, the lamp fixing structure and the backlight module of the invention have the following advantages. Because the lamp holder has a pressing part, the lamp protecting member has a first hole and the wire passes through the first hole, the pressing part presses the lamp protecting member when the lamp protecting member is disposed in the lamp holder so that the first hole shrinks, and the first hole is fitted tightly to the wire to fix the wire in place. Consequently, it is possible to prevent the solder crack caused by an external force which is applied to the wire. In addition, a chamber may be formed on a top surface of the lamp protecting member in this invention in order to facilitate the bonding of the wire to the electrode of the lamp and thus the electrical connection of the wire to the electrode of the lamp. Thus, it is possible to avoid various problems induced by the related art drawback that the lamp and the wire cannot be inserted into the lamp protecting member until the lamp and the wire are bonded together. Consequently, the yield and the reliability of the backlight module of the LCD apparatus can be enhanced. In addition, compared with the related art, the invention can achieve the object of fixing the wire using the simple structure design without the need for a complicated manual wire winding process. Thus, the labor and manufacturing costs can be reduced, and the production time can be shortened.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references designate like elements.

The lamp fixing structure according to the preferred embodiment of the invention will be described with reference to FIGS. 3 to 6B.

Figure 1:
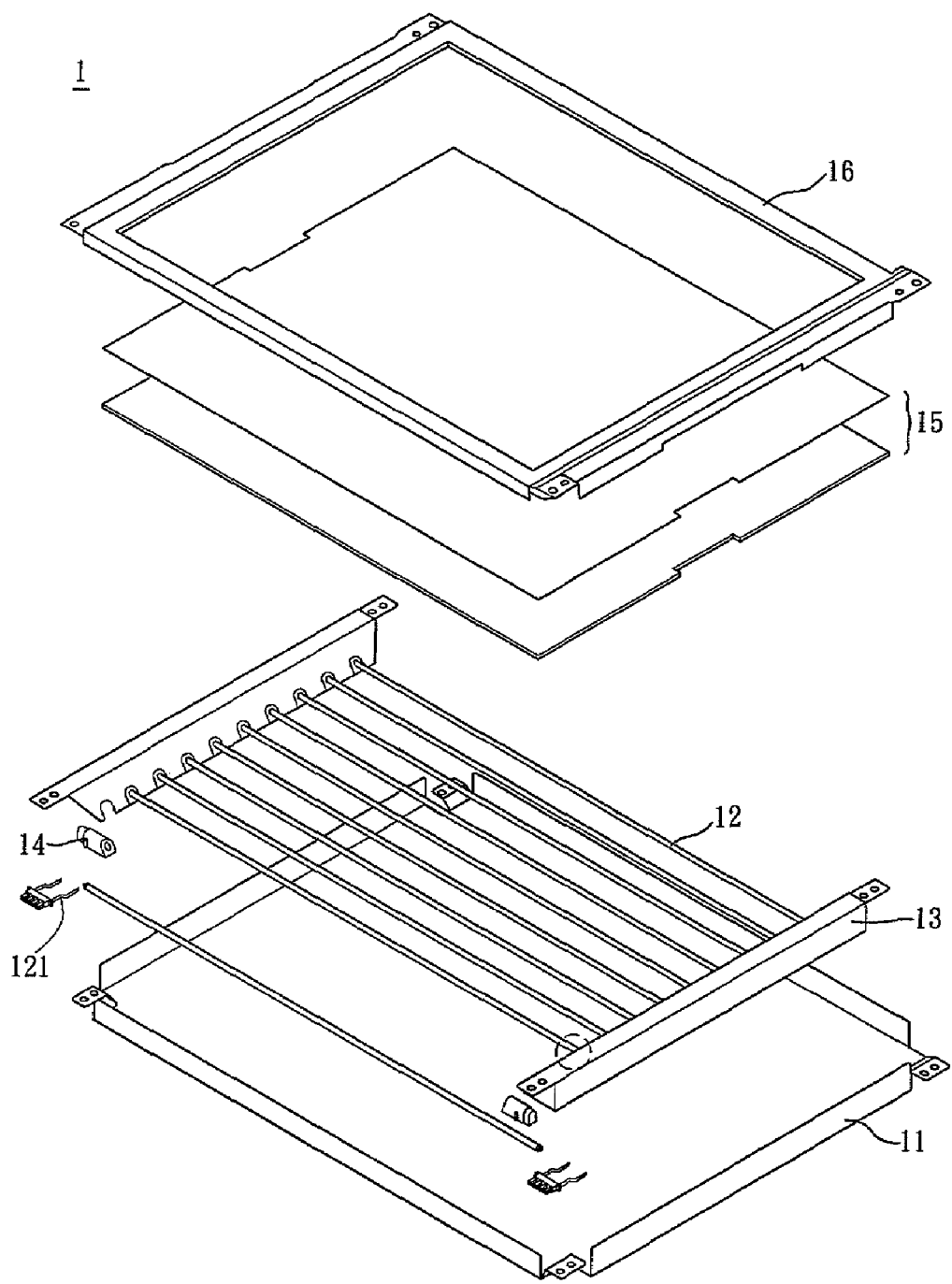
FIG. 1 is a schematic illustration showing a conventional backlight module.
Figure 2:
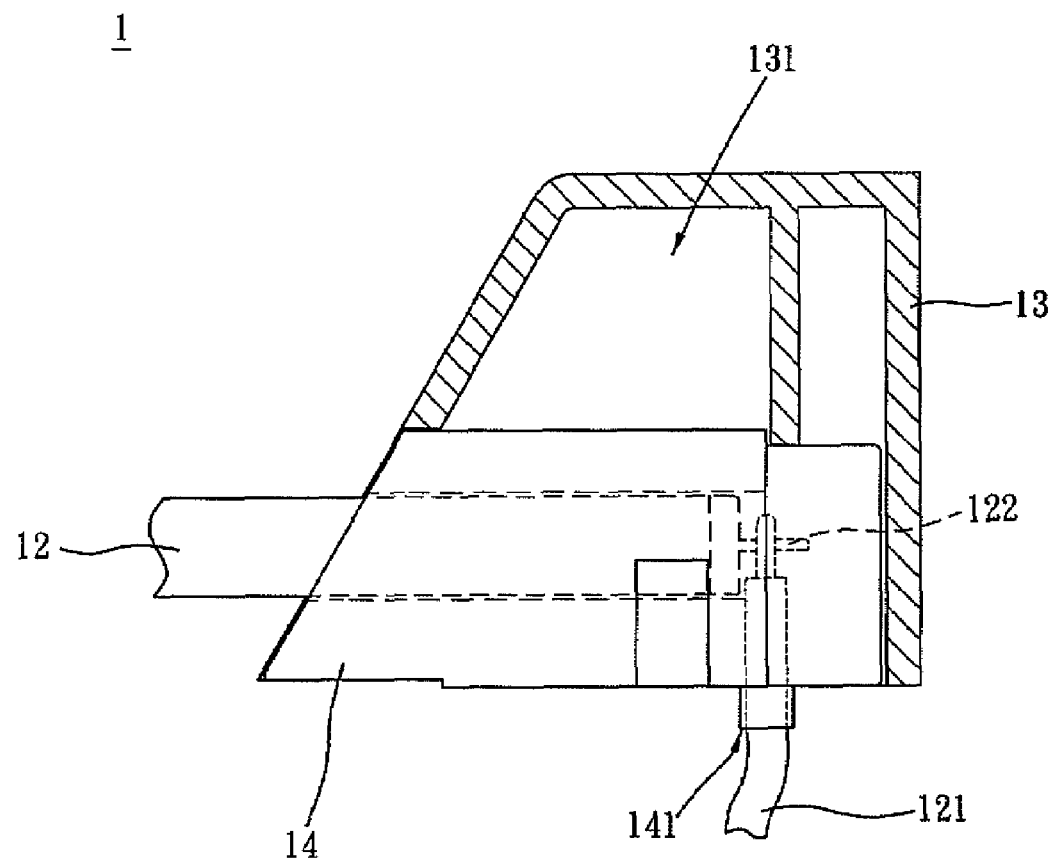
FIG. 2 is a partially schematic illustration showing the conventional backlight module.
Figure 3:
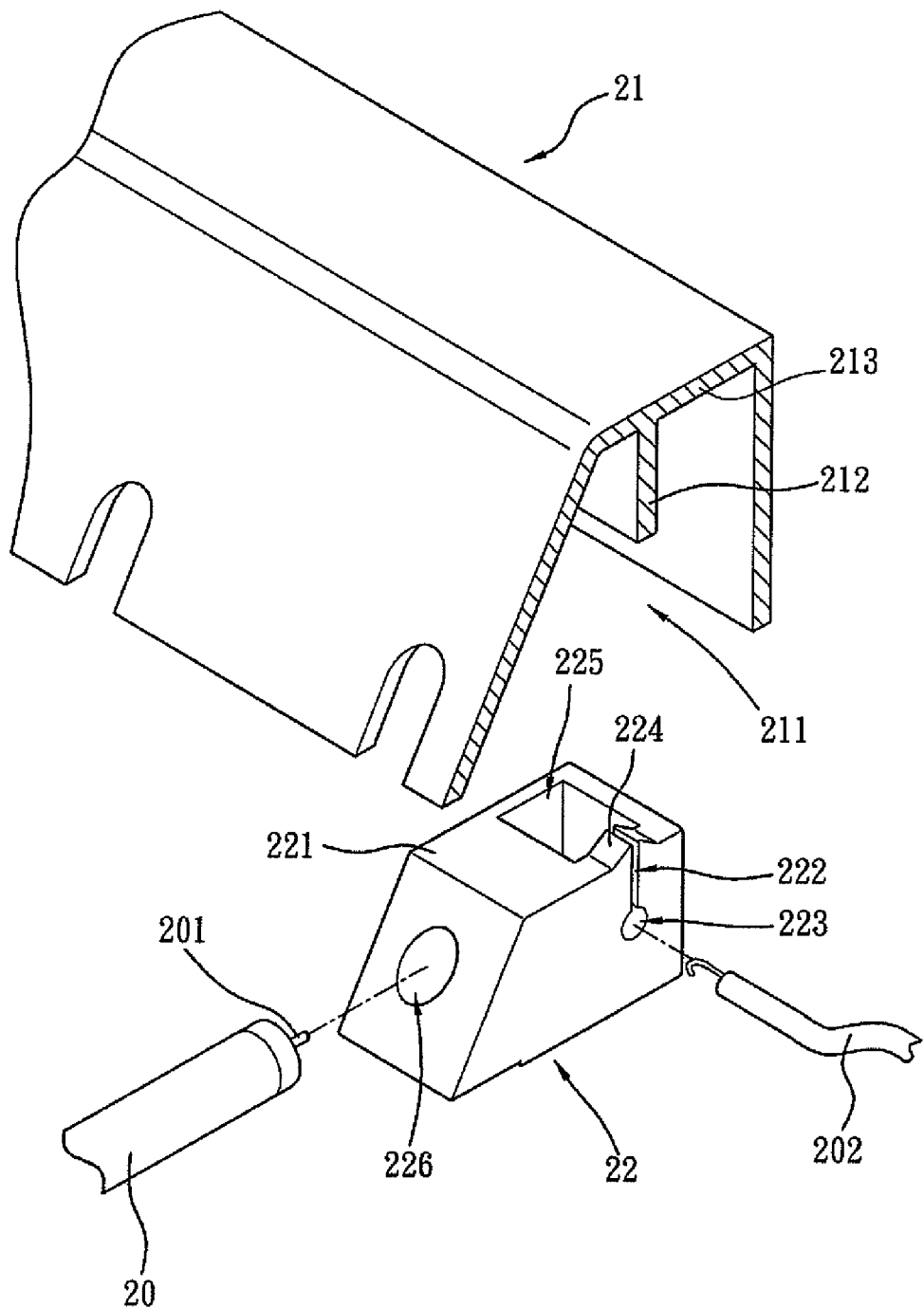
FIG. 3 is a schematic illustration showing a lamp fixing structure according to a first embodiment of the invention.

Referring to FIG. 3, a lamp fixing structure 2 applied with a lamp 20 includes a lamp holder 21 and at least one lamp protecting member 22. The lamp holder 21 has at least one hollow chamber 211 and at least one pressing part 212, which projects from an inner wall 213 of the lamp holder 21, and is disposed within the hollow chamber 211. In this embodiment, the pressing part 212 is a rib which is integrally (or unitarily) formed with the lamp holder 21. It is to be noted that the shape of the pressing part 212 is not particularly limited to that of the rib, but may be any other convenient shape. In addition, the lamp holder 21 shown in FIG. 3 may be regarded as one portion of the lamp holder 21 of this embodiment. The length of the lamp holder 21 may be designed according to the number of the lamps 20 applied therewith. In addition, the lamp 20 of this embodiment is a cold cathode fluorescent lamp (CCFL) and has an electrode 201 and a wire 202.

In this embodiment, the lamp protecting member 22 has a top surface 221, a slit 222, a first hole 223 and a protrusion 224. The slit 222 extends from the top surface 221 and is connected to the first hole 223. The protrusion 224 is disposed on the top surface 221 and adjacent to the slit 222. Herein, the protrusion 224 has a triangular shape, for example, and is disposed on two sides of the slit 222. It is to be noted that the protrusion 224 is not restricted to the triangular shape but may have any other shape, and may be disposed on only one side of the slit 222. In addition, the lamp protecting member 22 further has a chamber 225, which is disposed on the top surface 221 and communicates with the first hole 223, and a second hole 226, which communicates with the chamber 225.

Figure 4:
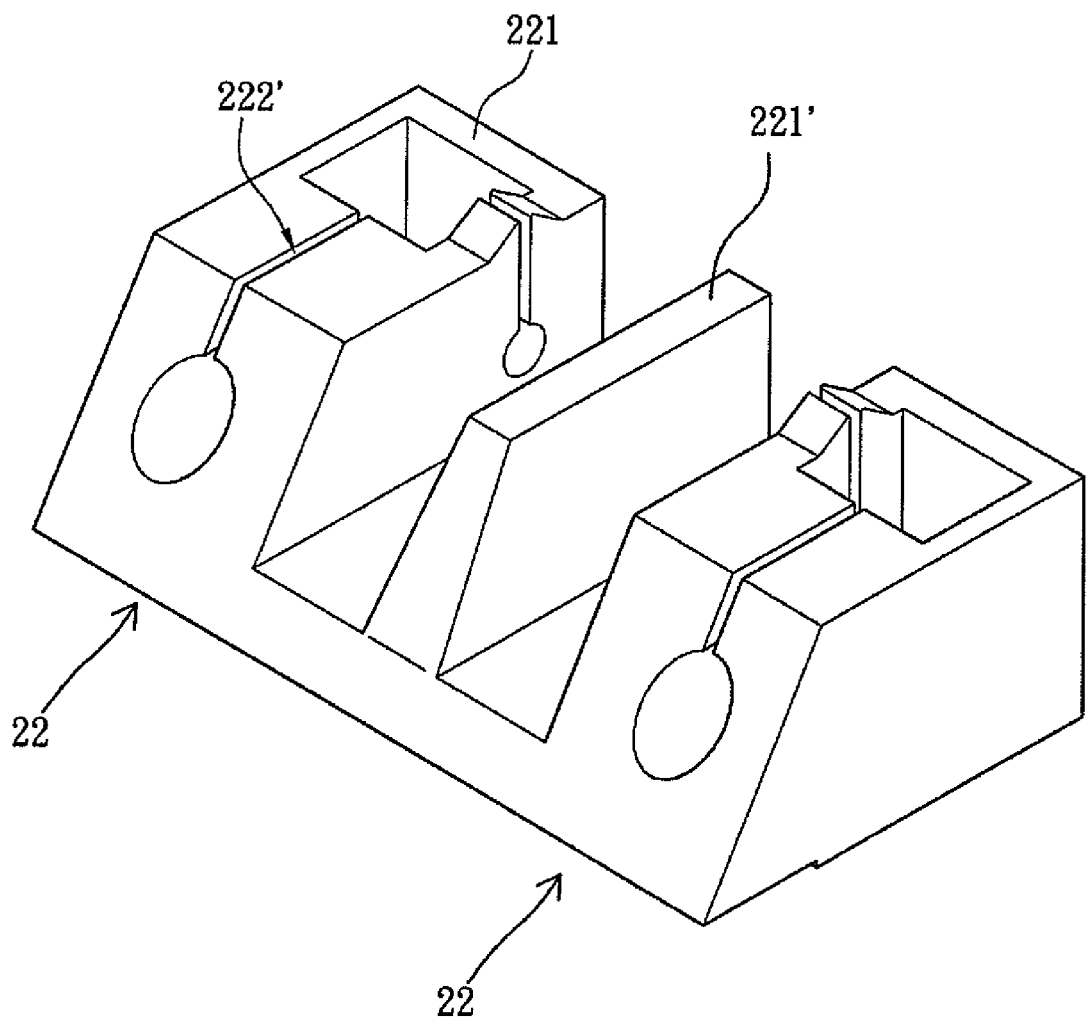
FIG. 4 is a schematic illustration showing a lamp protecting member according to a second embodiment of the invention.

It is to be noted that the lamp protecting member 22 of this embodiment may be one entity or have other aspects. Referring to FIG. 4, another lamp protecting member 22' is composed of a plurality of lamp protecting members 22 connected together to form an entity. The lamp protecting members 22 are integrally formed. In addition, at least one reinforcement part 221' may be disposed between the lamp protecting members 22 to reinforce the overall structure intensity. In addition, another slit 222' still can be formed on the top surface 221 of each lamp protecting member 22. In this embodiment, the slit 222' makes the lamp protecting members 22 and 22' be conveniently de-molded after the injection molding because a mold assistant may be placed in the slit 222' when the injection molding is being conducted.

As shown in FIG. 3, when the soldering process is being performed, the lamp 20 passes through and is inserted into the lamp protecting member 22 via the second hole 226 so that one end of the lamp 20 is accommodated within the chamber 225. The wire 202 passes through the lamp protecting member 22 via the first hole 223. The soldering operator connects the wire 202 to the electrode 201 of the lamp 20 in the chamber 225 by way of hook-soldering. In this embodiment, the chamber 225 allows the soldering operator at the upside to perform the soldering process in the chamber 225 so as to eliminate various problems induced in the prior art, in which the lamp 20 and the wire 202 cannot be inserted into the lamp protecting member 22 until they are bonded together. In addition, the lamp protecting member 22 may be made of an elastic material, such as rubber, for protecting the lamp 20 and the wire 202 from being rubbed and damaged.

Figure 5:
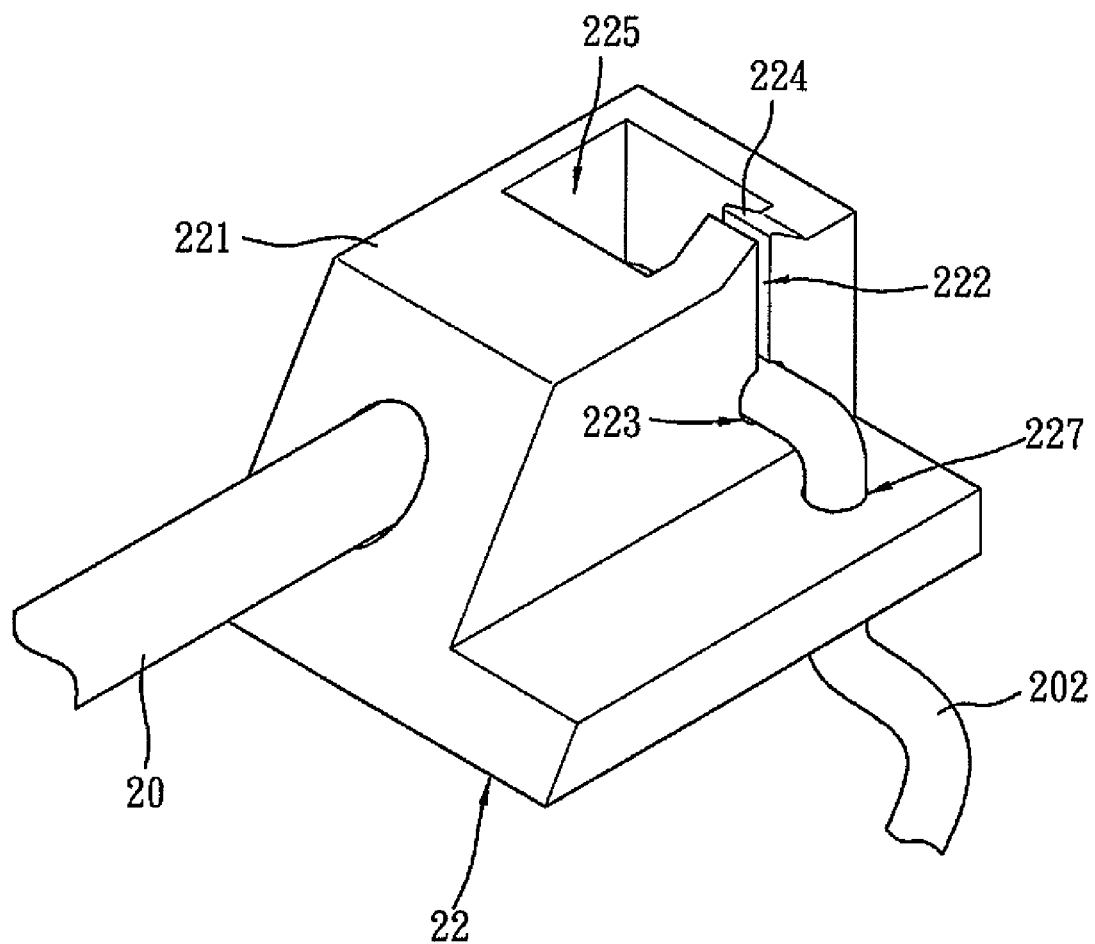
FIG. 5 is a schematic illustration showing a lamp and the lamp protecting member, which are assembled together, according to the a third embodiment of the invention.

FIG. 5 is a schematic illustration showing the lamp 20 and the wire 202, which are bonded. As shown in FIG. 5, the lamp 20 is inserted into the lamp protecting member 22, and its wire 202 passes through the lamp protecting member 22 from the first hole 223. Herein, the lamp protecting member 22 may further have a third hole 227, through which the wire 202 passes so that the wire 202 passes through the lamp protecting member 22 and is connected to a terminal of a drive control circuit of the lamp 20 and the wire 202 may be fixed to the lamp protecting member 22 more stably.

Figure 6A:
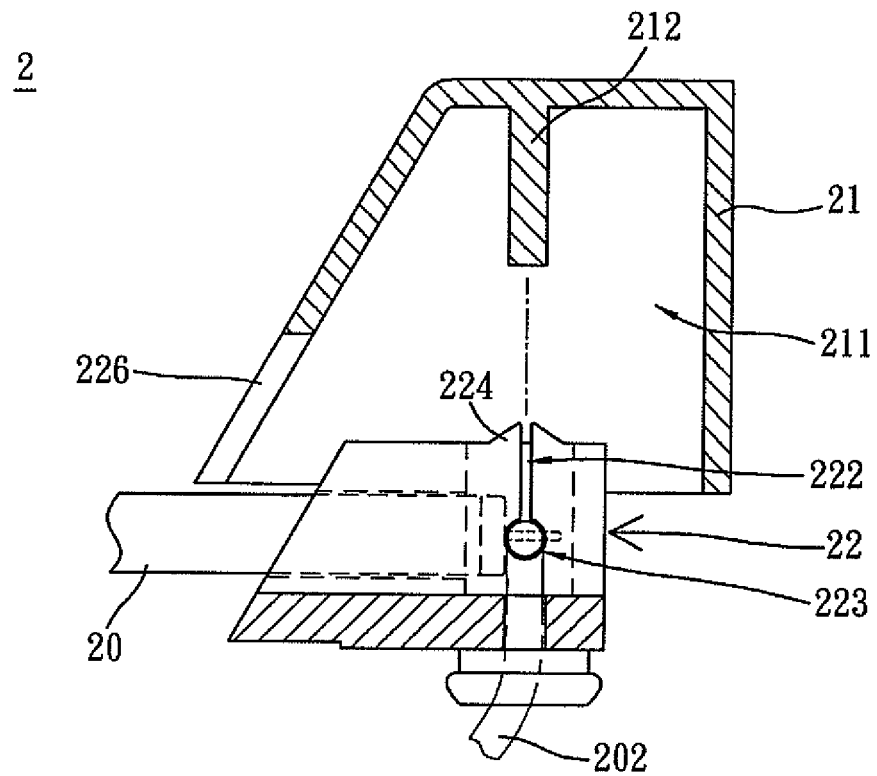
FIG. 6A is a sectional illustration showing the lamp fixing structure before being assembled according to an embodiment of the invention.
Figure 6B:
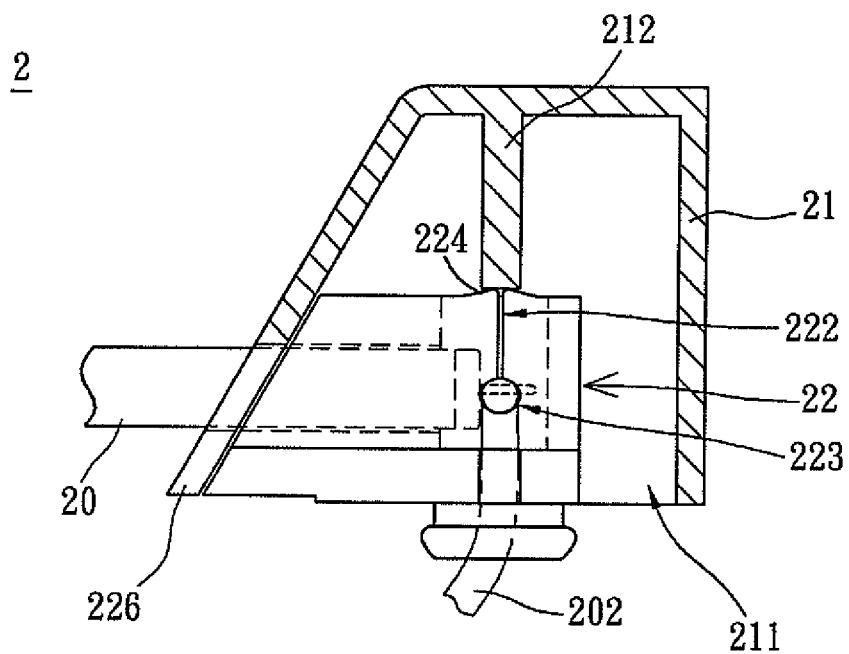
FIG. 6B is a schematic illustration showing the lamp fixing structure after being assembled according to the above mentioned embodiment of the invention.

FIGS. 6A and 6B are schematically illustrations showing the lamp protecting member 22 and the lamp holder 21, wherein FIG. 6A shows the state before being assembled and FIG. 6B shows the state after being assembled. As shown in FIGS. 6A and 6B, the lamp protecting member 22 is disposed in the hollow chamber 211 of the lamp holder 21 and is connected to the lamp holder 21. Herein, the lamp protecting member 22 may be inserted into or adhered to the lamp holder 21, or may be limited by an external spatial limiting element, which fixes the relative position between the lamp protecting member 22 and the lamp holder 21. After the lamp protecting member 22 and the lamp holder 21 are assembled together (see FIG. 6B), the pressing part 212 of the lamp holder 21 presses the protrusion 224 of the lamp protecting member 22 and the protrusion 224 deforms and presses downward so that the slit 222 and the first hole 223 shrink and the first hole 223 is fitted tightly to the wire 202 to achieve the object of fixing the wire 202.

Figure 7:
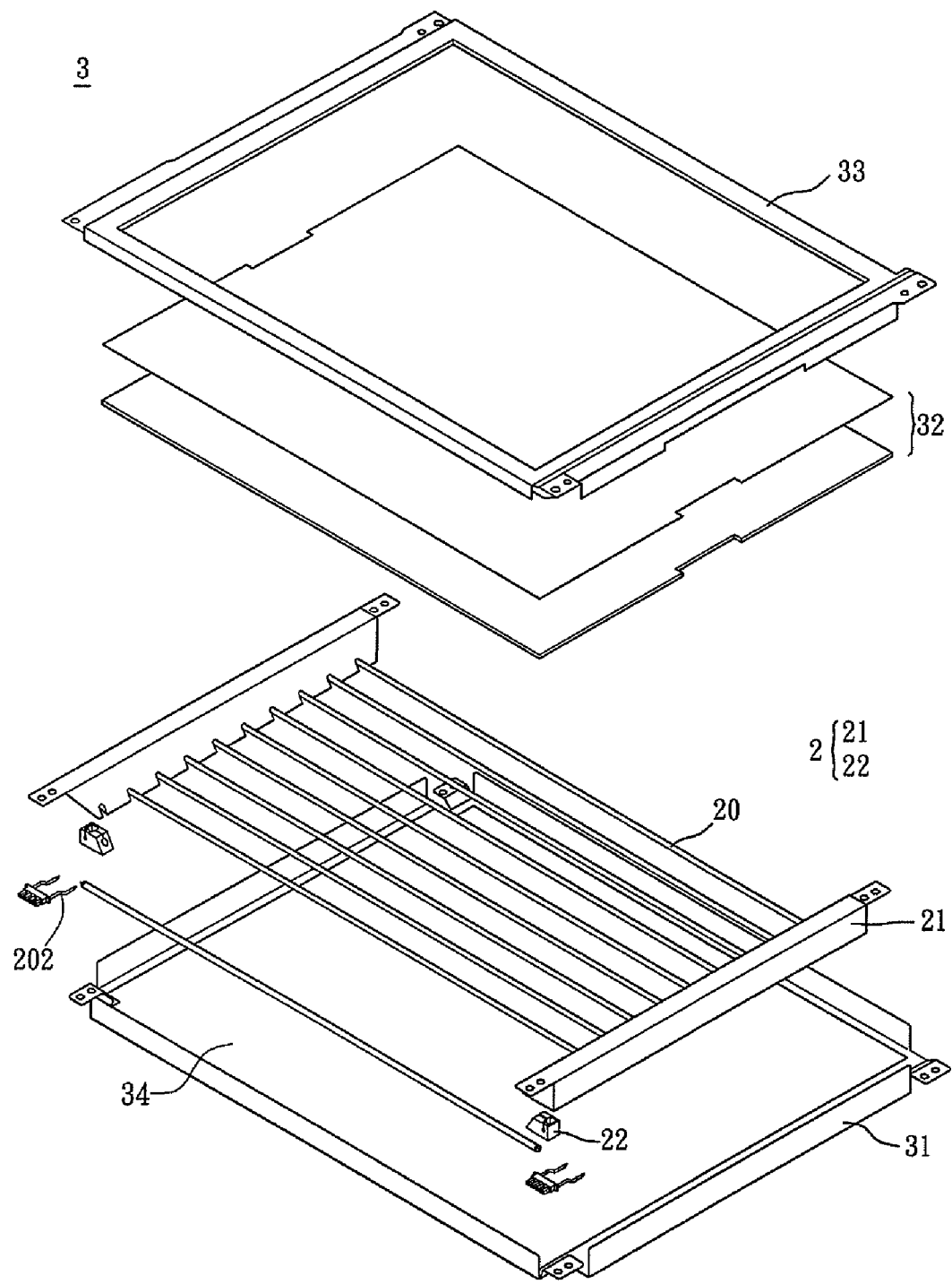
FIG. 7 is a schematic illustration showing a backlight module according to another embodiment of the invention.

Next, a backlight module 3 according to another preferred embodiment of the invention will be described with reference to FIG. 7.

The backlight module 3 of this embodiment includes a backplate 31, lamps 20 and lamp fixing structures 2. The lamp fixing structure 2 has been described in the above-mentioned embodiment, so detailed descriptions thereof will be omitted. Herein, two ends of the lamp 20 are respectively inserted into the lamp protecting members 22, which are disposed in the lamp holder 21. At this time, the wire 202 is fixed in the lamp protecting member 22. Herein, the connection relationships between the lamps 20, the lamp protecting members 22 and the lamp holders 21 have been described in the above-mentioned embodiment, so detailed descriptions thereof will be omitted.

The lamps 20 and the lamp fixing structures 2 are disposed on the backplate 31. The lamps 20 are disposed on the backplate 31 in parallel, and the lamp holders 21 are disposed on two lateral sides of the backplate 31. In addition, the backlight module 3 further has an optical film set 32 and a frame body 33. The optical film set 32 is disposed on the lamp holder 21 and over the backplate 31 and is then combined with the backplate 31 through the frame body 33 so that the lamps 20, the lamp fixing structure 2 and the optical film set 32 are fixed between the frame body 33 and the backplate 31. Therefore, the frame body 33 and the backplate 31 may serve as external spatial limiting elements for the lamp protecting member 22 and the lamp holder 21. Herein, the optical film set 32 may be selected from at least one of the group consisting of an upper diffuser film, a brightness enhancement film, a prism and a lower diffuser film. In addition, the frame body 33, the lamp holder 21 and the backplate 31 may be combined together by way of engaging, adhering or screwing.

Consequently, the light rays outputted from the lamps 20 pass through the optical film set 32 and emit out of the backlight module 3. The diffuser film, the brightness enhancement film, the prism or the combination thereof makes the light rays outputted from the lamps 20 be uniformly dispersed, gathered and brightness-enhanced so that the better optical property can be obtained. In addition, a reflector 34 may be disposed on the backplate 31 so that a portion of the light rays outputted from the lamps 20 can be reflected by the reflector 34 to the optical film set 32, and the light ray availability and the brightness of the backlight module 3 may be enhanced.

Finally, an LCD apparatus 4 according to still another preferred embodiment of the invention will be described with reference to FIG. 8.

Figure 8:
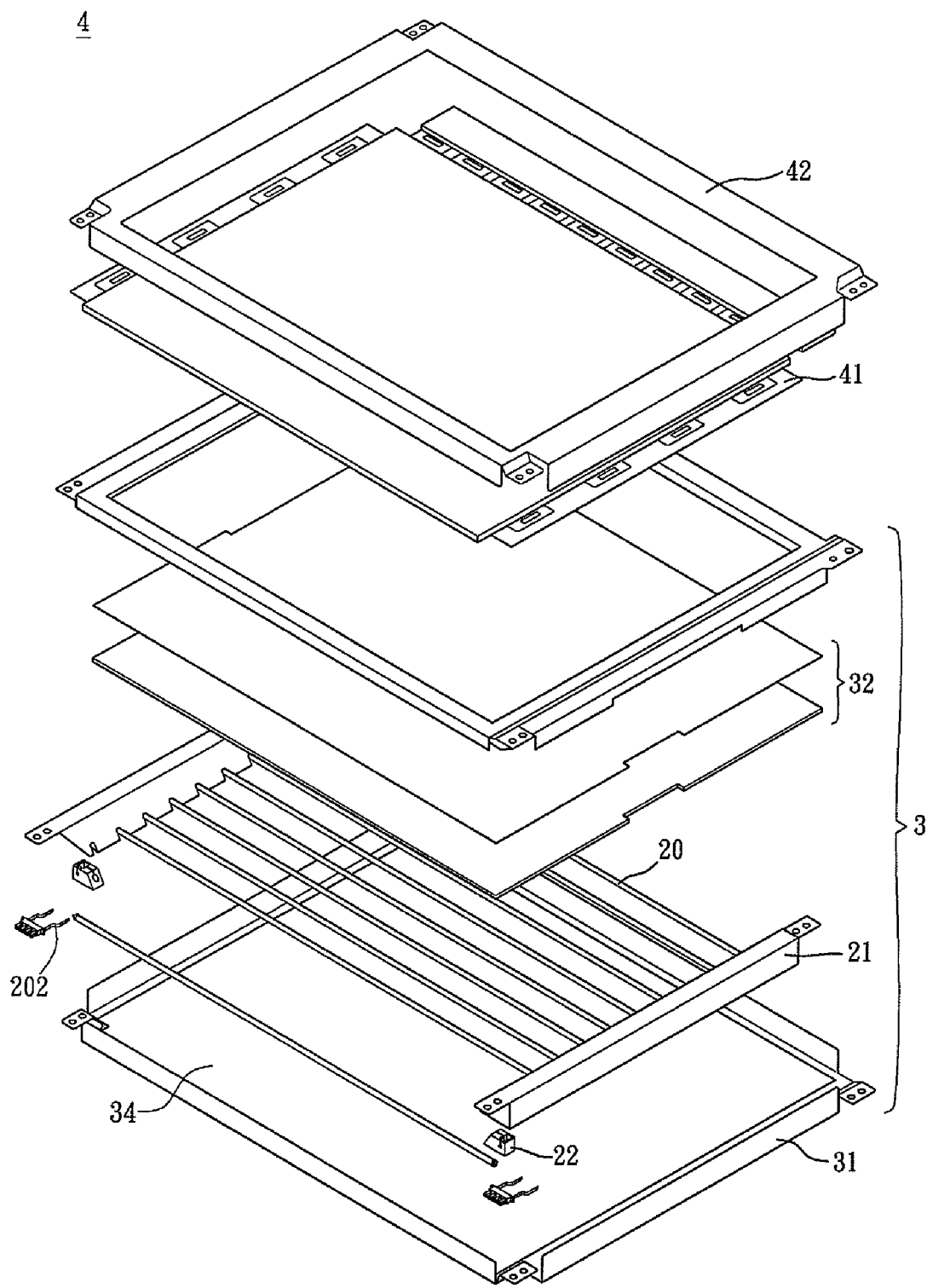
FIG. 8 is a schematic illustration showing an LCD apparatus according to still further embodiment of the invention.

Referring to FIG. 8, the LCD apparatus 4 includes a backlight module 3 and an LCD panel 41. The backlight module 3 has been described in the above-mentioned embodiment, so detailed descriptions thereof will be omitted.

In addition, the LCD panel 41 is disposed adjacent to the backlight module 3. In general, the LCD panel 41 includes a first substrate, a second substrate and a liquid crystal layer interposed between the first substrate and the second substrate. Of course, the LCD panel 41 further has a drive control circuit for controlling displayed frames of the LCD panel 41.

In this embodiment, the LCD apparatus 4 may further include an external frame 42, which is combined with the backplate 31 of the backlight module 3 to sandwich the LCD panel 41 between the external frame 42 and the backlight module 3. At this time, the light rays outputted from the backlight module 3 enter the LCD panel 41 so that the frame is produced.

In summary, the lamp fixing structure and the backlight module of the invention have the following advantages. Because the lamp holder has a pressing part, the lamp protecting member has a first hole and the wire passes through the first hole, the pressing part presses the lamp protecting member when the lamp protecting member is disposed in the lamp holder so that the first hole shrinks, and the first hole is fitted tightly to the wire to fix the wire. Consequently, it is possible to prevent the solder crack caused by the external force for twitching the wire. In addition, a chamber may be formed on a top surface of the lamp protecting member in this invention in order to facilitate the bonding of the wire to the electrode of the lamp and thus the electrical connection of the wire to the electrode of the lamp. Thus, it is possible to avoid various problems induced by the related art drawback that the lamp and the wire cannot be inserted into the lamp protecting member until the lamp and the wire are bonded together. Consequently, the yield and the reliability of the backlight module of the LCD apparatus can be enhanced. In addition, compared with the related art, the invention can achieve the object of fixing the wire using the simple structure design without the complicated wire. Thus, the labor and manufacturing costs can be reduced, and the production time can be shortened.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A lamp fixing structure for a lamp, which has an electrode and a wire electrically connected to the electrode, the lamp fixing structure comprising:

a lamp holder having at least one pressing part; and at least one lamp protecting member having a first hole, wherein the lamp is inserted into the lamp protecting member, the wire passes through the lamp protecting member via the first hole and the pressing part presses the lamp protecting member so that the first hole and the wire are fitted tightly, wherein the lamp protecting member further has a top surface, a slit and a protrusion, wherein the slit extends from the top surface to the first hole, the protrusion is disposed on the top surface and adjacent to the slit, and the pressing part presses the protrusion.

2. The lamp fixing structure according to claim 1, wherein the protrusion is disposed on two sides of the slit.

3. A backlight module, comprising: a backplate; a lamp having an electrode and a wire electrically connected to the electrode; and a lamp fixing structure, which is disposed on the backplate and has a lamp holder and at least one lamp protecting member, wherein the lamp holder has at least one pressing part, the lamp protecting member has a first hole, the lamp is inserted into the lamp protecting member, the wire passes through the lamp protecting member from the first hole and the pressing part presses the lamp protecting member so that the first hole and the wire are fitted tightly, wherein the lamp protecting member further has a top surface, a slit and a protrusion, the slit extends from the top surface to the first hole, the protrusion is disposed on the top surface and adjacent to the slit, and the pressing part presses the protrusion.

4. The backlight module according to claim 3, wherein the protrusion is disposed on two sides of the slit.

5. The backlight module according to claim 3, wherein the lamp protecting member further comprises a chamber disposed on the top surface, and the first hole communicates with the chamber.

6. The backlight module according to claim 5, wherein one end of the lamp is accommodated within the chamber.

\* \* \* \* \*